(12) United States Patent
Dobbins (10) Patent No.: US 9,113,518 B2
(45) Date of Patent: Aug. 18, 2015

(54) BATTERY POWERED LIGHT SOURCE FOR COMPARTMENT ILLUMINATION

(71) Applicant: Ellenby Technologies, Inc., Woodbury Heights, NJ (US)

(72) Inventor: Aaron H. Dobbins, Cherry Hill, NJ (US)

(73) Assignee: Ellenby Technologies, Inc., Woodbury Heights, NJ (US)

( * ) Notice: Subject to any disclaimer, the term of this patent is extended or adjusted under 35 U.S.C. 154(b) by 0 days.

(21) Appl. No.: 14/328,784

(22) Filed: Jul. 11, 2014

(65) Prior Publication Data

US 2015/0028751 A1    Jan. 29, 2015

Related U.S. Application Data

(60) Provisional application No. 61/845,095, filed on Jul. 11, 2013, provisional application No. 61/875,205, filed on Sep. 9, 2013.

(51) Int. Cl.
*H05B 33/08* (2006.01)

(52) U.S. Cl.
CPC ................... *H05B 33/0812* (2013.01)

(58) Field of Classification Search
None
See application file for complete search history.

(56) References Cited

U.S. PATENT DOCUMENTS

| | | | |
|---|---|---|---|
| 6,709,126 B1 | 3/2004 | Leen | |
| 6,820,998 B2 | 11/2004 | Chen | |
| 8,203,581 B2 | 6/2012 | Garcia et al. | |
| 8,328,387 B2 | 12/2012 | Hying et al. | |
| 8,362,707 B2 | 1/2013 | Draper et al. | |
| 8,461,510 B2 | 6/2013 | Williams et al. | |
| 2008/0094837 A1 | 4/2008 | Dobbins et al. | |
| 2014/0097758 A1* | 4/2014 | Recker et al. | 315/152 |

* cited by examiner

*Primary Examiner* — Crystal L Hammond
(74) *Attorney, Agent, or Firm* — Law Offices of Peter H. Priest, PLLC (57) ABSTRACT

A battery powered LED light source is described for illuminating the inside of a dark enclosure when the enclosure is opened in an environment with ambient illumination. Drive circuitry adapted to the LED light source turns on the LEDs when levels of ambient light above a threshold are detected, which may occur if the light source is placed in a dark enclosure that is opened in a lit room. After being opened, the drive circuitry periodically strobes off the LED light source to take ambient light measurements without the contribution of its own LED light for determining if the enclosure has been closed and the LED light source should again be shut off.

20 Claims, 10 Drawing Sheets

BATTERY POWERED LIGHT SOURCE FOR COMPARTMENT ILLUMINATION

The present invention claims the benefit of U.S. Provisional Application Ser. No. 61/875,205, filed on Sep. 9, 2013 and U.S. Provisional Application Ser. No. 61/845,095 filed on Jul. 11, 2013, both of which are incorporated by reference herein in their entirety.

FIELD OF THE INVENTION

The present invention relates generally to improvements to battery powered light sources, and more particularly to improved techniques for detecting a change in ambient lighting to turn on a light source and advantageous techniques for turning off the light source.

BACKGROUND OF THE INVENTION

Oftentimes, there is a desire to illuminate a compartment space when a compartment door is opened. Examples of compartments benefiting from illumination include automobile or boat storage consoles, cabinetry, security safes, lockers, the inside of a refrigerator, closets, and the like. While some such compartments are wired with electricity, many such compartments are not wired for electricity and it can be a costly process to connect these compartments to a plentiful power source such as an AC mains, a car battery or the like, which will typically involve drilling, wiring, and housing power adapter electronics.

A popular alternative to wired illumination of compartments is the use of battery powered light sources, especially battery powered light emitting diode (LED) light sources which can run for several hours before changing batteries. In a common form, these light sources have a push button for toggling the lights on and off. Whereas these light sources save the cost and effort of running wires and power conversion hardware from a plentiful supply, users can easily forget to turn off the lights when they no longer require illumination resulting in needing to frequently replace batteries that have lost their charge as a result of the lights being left on.

Improvements on the simple toggle switch have included the use of turn-off timers that automatically shut off the LEDs a predetermined time after the user has switched it on. These timers are often set for one particular time duration which may or may not be appropriate for how the user is interacting with the compartment. They also require the user to manipulate a toggle switch to turn the light on which can be inconvenient when one's hands are full, for example.

Toggle switches have also been tethered to wire harnesses and installed against the compartment door such that the door itself actuates the switch when closed to turn off the light, and actuates the switch when open to turn on the light. This method, while promoting efficient use of the battery, requires the additional cost of cabling and a remote door switch, and takes extra time to install within the compartment. Tethered switches further require that the LED module cannot be easily removed from the compartment and used as a fully portable light source if desired.

Additional improvements have included the use of proximity sensors employing passive infrared (IR) sensors to sense motion to trigger the LED source on. A lack of motion prompts the LED source to turn off. This solution results in far less wasted power from the batteries by ensuring the compartment is lit only while the user is interacting with it. Proximity sensors, however, have the disadvantage of requiring special placement within the compartment to detect motion which may be different than the location for optimal illumination, may require the use of a lens design that is typically separate from the primary light source lens, and may result in a higher product cost. In some designs, proximity sensors are mounted remotely from the light source complicating the installation and further increasing the product cost.

Another class of available LED products combine LED light sources with ambient light sensors for the purpose of turning on the LEDs in the dark. This technique is commonly employed in outdoor landscape lighting and nightlights. These devices, like those taught by Leen in U.S. Pat. No. 6,709,126, place the ambient light sensors away from the LED light source such that the LED light source does not impact the detected ambient light measurement. This class of product would not be suitable for compartment lighting as the triggering sensor would likely be always lit if placed in a closed compartment, unnecessarily wasting battery power.

SUMMARY OF INVENTION

One aspect of the present invention seeks to provide a low cost method of detecting when a compartment is opened and closed using an ambient light sensing approach that advantageously may use the same lensing as the LED light source itself. One aspect of the invention addresses a feature by which the LEDs will strobe thereby providing an alert if a compartment is left open too long. This feature is particularly useful for compartments that are intended to be latched closed for safety reasons when not in use such as gun safes, equipment cabinets on boats, or overhead storage compartments on moving vehicles.

One objective of the present invention is to provide a battery powered LED light source for use in compartments that are substantially void of ambient light when closed, such as the interior compartment of a safe, for example. The light source is controllably turned on when the measured ambient light in the compartment where the light source is installed passes above a low threshold level consistent with the compartment being opened in an environment with at least a low level of ambient illumination.

Another object of the present invention is to locate the ambient light sensor inside the same enclosure as the LED light source where both the sensor and the LEDs use the same lens.

Another object of the present invention is to disclose a method of turning the LED light source off once the compartment is closed by strobing off the LED source and measuring the ambient light level in the absence of LED light to see if the light has returned below a second low level threshold. The strobing action serves as both a mechanism for the control circuitry to measure the ambient light level in the absence of the LED light source, and as an alert indicating to the user that the compartment is still open. The strobing off interval can be made purposely long in duration to alert users that a compartment is left open, or it can be made purposely short in duration so as to be imperceptible to the human eye.

Another object of the present invention is to provide an LED light module wherein the power source can be either included within a common housing to the LEDs and ambient light sensors, or alternatively, can be located remotely from the LED and ambient light sensor housing in the case a slim profile is desired.

Another object of the present invention is to provide approaches in which multiple LED light source modules can be placed within the same compartment to more completely illuminate the interior space of a compartment.

A further object of the present invention is to provide a technique to turn on the LED light source placed within a dark compartment when the compartment door is opened even when the compartment is situated in a completely dark space through the use of a secondary battery powered pilot light accessory.

A further aspect of the present invention is to provide a low cost battery powered light which is triggered by a predetermined change in detected ambient light. For example, if a bike rider is driving down a road or street, and a headlight shines on the ambient light sensors, the measured change in ambient light will be adequate to trigger the LED light source which will then turn off after the headlight passes by.

A more complete understanding of the present invention, as well as further features and advantages of the invention, will be apparent from the following Detailed Description and the accompanying drawings.

DETAILED DESCRIPTION OF THE DRAWINGS

Figure 1:
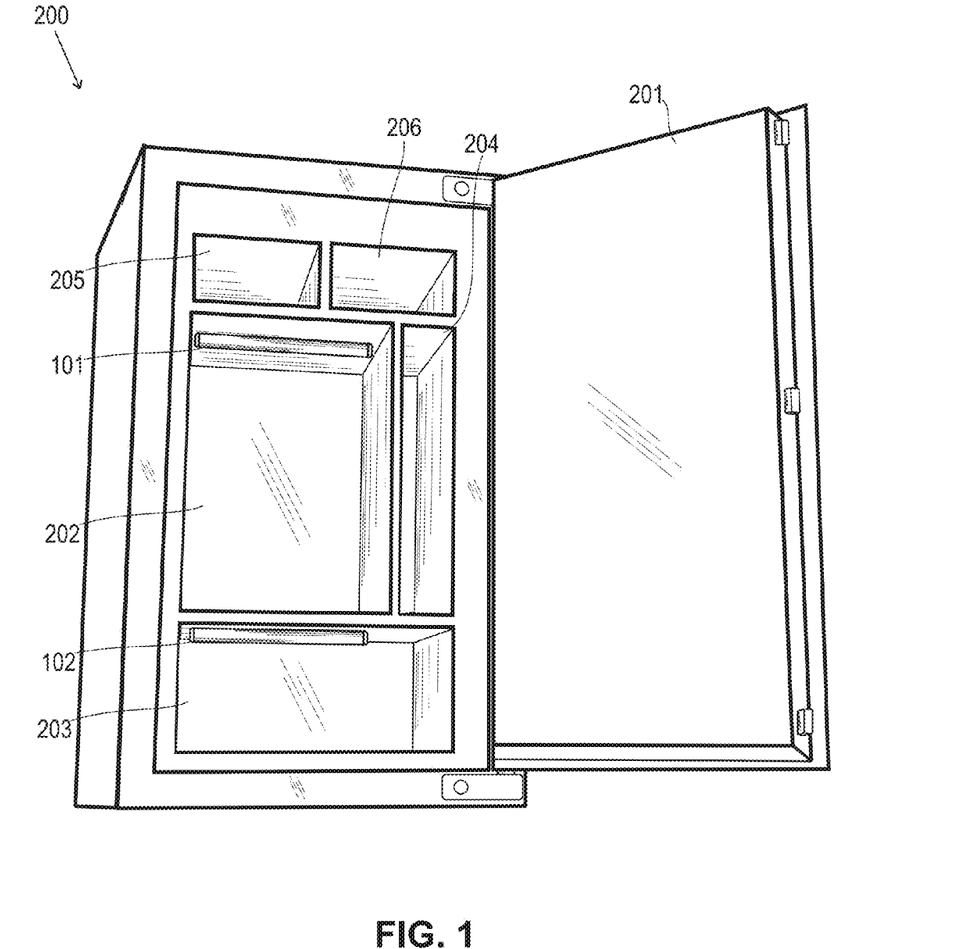
FIG. 1 shows an illustration of two LED light modules in accordance with the present invention installed a security safe.

In FIG. 1, two LED modules 101 and 102 are shown installed in a large security safe 200. The safe has a large upper compartment 202 and a lower compartment 203. When the safe door 201 is opened, ambient light from the room falls upon the LED modules 101 and 102 causing them to turn on and illuminate their respective compartments. In this particular embodiment, the LED modules 101 and 102 are installed width-wise or parallel to the ceilings of the two large compartment areas 202 and 203, respectively. In an alternate embodiment shown in FIG. 2, the LED modules 101 and 102 can be installed along an orientation extending into the depth of the safe 200. Installation along the depth orientation may allow for smaller compartments such as 203, 205, and 206 to be lit by an LED module. It will be recognized that in some contexts, it may be desirable to mount the LED modules in the height-wise dimension running up and down the walls of the compartment, or in some combination of different orientations of width, depth and height, or angled therewith, as desired. It will be recognized the modules 101 and 102 can be attached to the compartment ceiling with a variety of attachment methods including but not limited to Velcro, brackets, magnets, adhesive, tape, or the like. Preferably, the modules 101 and 102 are mounted so that either of them can be temporarily removed and used as a flashlight, for example, to search smaller crevices within the compartment space. Several mounting brackets or Velcro strips can also be affixed to the compartment such as a safe such that a single LED module can be installed in various positions and orientations depending on how the safe is used.

Figure 2:
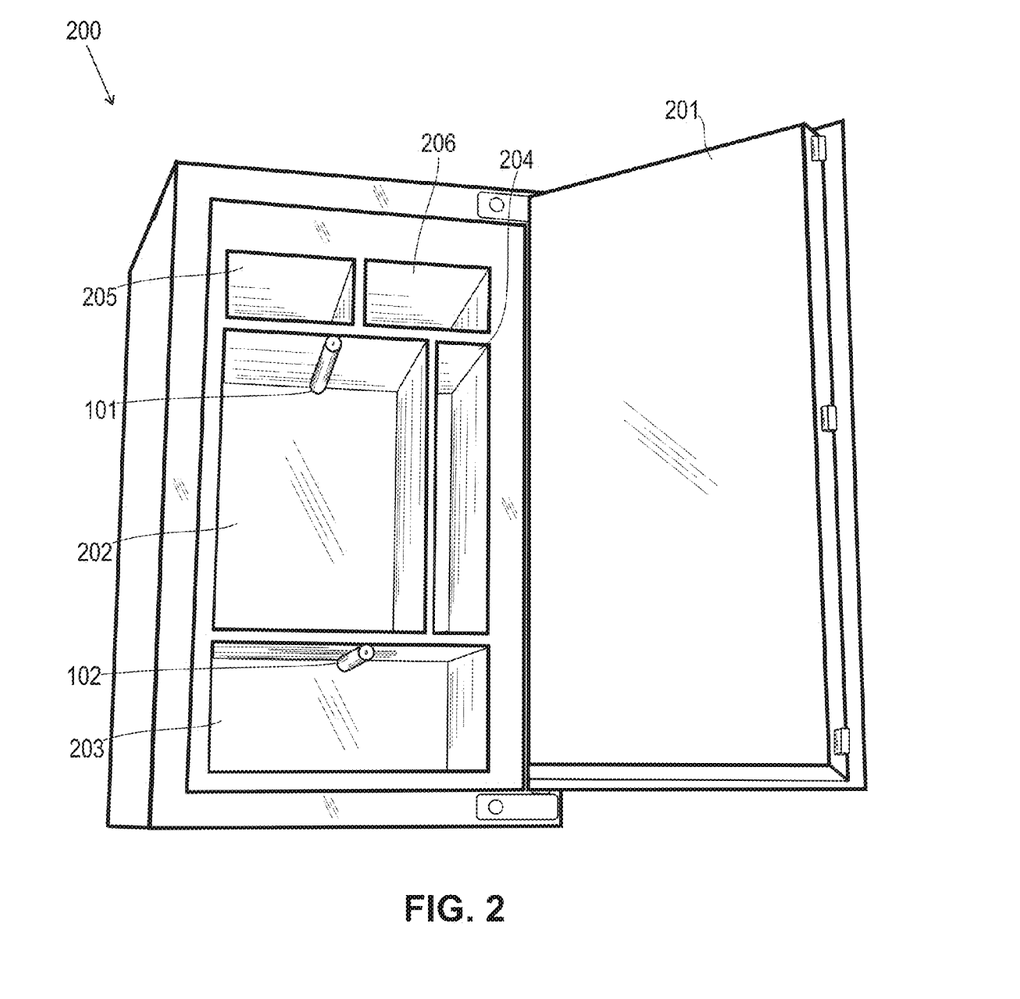
FIG. 2 shows an alternative mounting of two LED light modules installed in a security safe.

While FIGS. 1 and 2 show a safe 200 with a door 201 which swings open on a hinge, it will be recognized that this embodiment is illustrative of other doored compartments such as closets having closet doors, cabinets with doors that open and close, and the like. It will also be recognized the invention disclosed herein is also applicable to drawers that slide open and closed, and as used herein "compartment opens" and "compartment closes" are intended to cover both the opening and closing of a door, a drawer, or the like.

Figure 3:
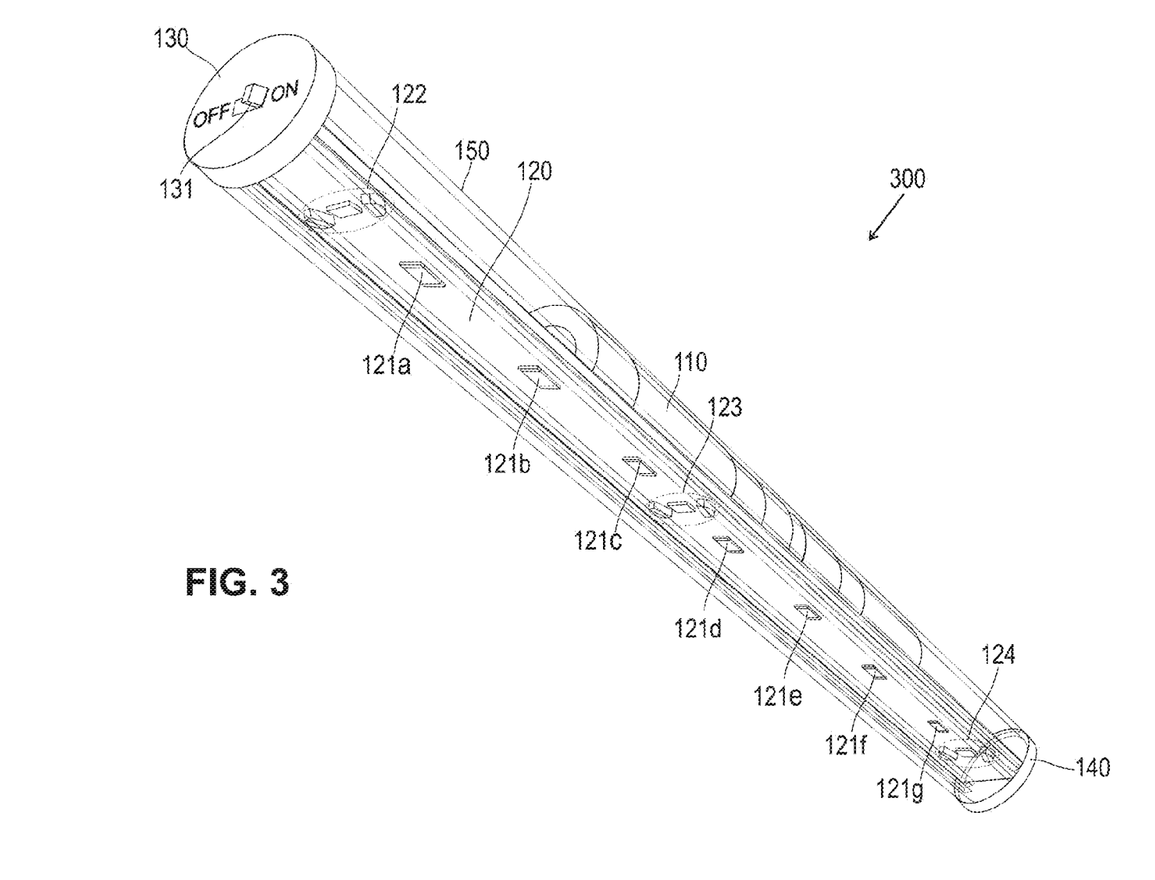
FIG. 3 shows a close-up view of one embodiment, of a LED light module suitable for use in FIGS. 1 and 2.

FIG. 3 shows a close-up view of an LED module 300 suitable for use as module 101 or 102 of FIGS. 1 and 2, illustrating a general mechanical structure of a presently preferred embodiment. The module 300 includes an outer cylindrical plastic tube 150, with preferred dimensions of 12 inches long by 1 inch in diameter. There is a front end cap 130 and rear end cap 140. Inside the tube, a printed circuit board 120 rests on a set of plastic guides 151 formed from the interior surface of tube 150 (seen more clearly in FIG. 4). The printed circuit board 120 has plural LEDs $121_a$, $121_b$, ... $121_g$ (collectively 121), for illuminating the compartment, as well as plural ambient light sensors 122, 123 and 124. As seen in FIG. 3, three sensors are shown at each end and in the middle of LED module 300. The board also has LED driver circuitry that determines when to turn on the LEDs based on the measured ambient light, as addressed further below.

Ambient light sensors can be spread throughout the length of the LED module to detect ambient light no matter what orientation the tube is placed, for example, width-wise or depth-wise, within a compartment. Light sensors 122 and 124 are located at the two ends of the tube and are well suited for a depth-wise installation as shown in FIG. 2. Light sensor 123 at the center of the tube are well suited for a width-wise installation as shown in FIG. 1.

A set of batteries 110 is housed between the printed circuit board and the plastic tube to supply power to the module 300. Preferably three AA sized batteries are used to provide several hours of operating life. An opening 131 for the on-off switch 125, is located on the front end cap 130 to provide customer access from the outside. In the on position, the LED module will only power the LEDs once the ambient light is greater than a lower threshold level. When in the off position, the LED module will not power the LEDs. The off position is useful to prevent the batteries from draining if a user knows they need the compartment to be open for an extended period of time. A third position could also be added to the switch 125 to force the module light on independent of the ambient light measurement. Alternatively, a push-button style switch could be mounted underneath a flexible material end cap to allow for a complete seal of the interior electronics from water or dirt.

Figure 4:
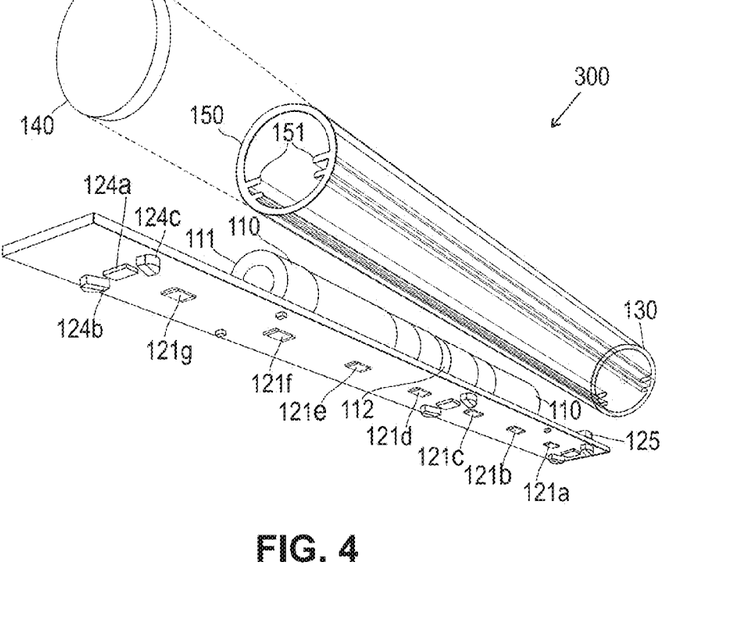
FIG. 4 shows an exploded view of the LED light module of FIG. 3.
Figure 5:
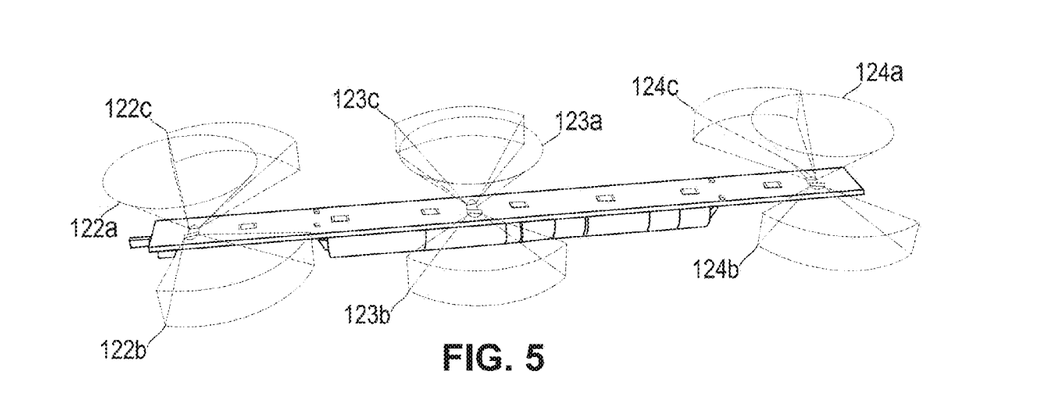
FIG. 5 shows an illustration of ambient light collection regions in a presently preferred embodiment.

In the exploded view of the LED module in FIG. 4, a battery spring contact 111 and retention clip 112 along with an additional spring contact on the back side of the batteries (hidden by the batteries 110) help to secure the batteries electrically and mechanically to the printed circuit board. Further detail of the cluster of three light sensors 124 is shown in FIG. 4 with 124b and 124c sideways facing to detect light with incident angles that are parallel to the board, and with center light sensor 124a facing perpendicular to the board surface to collect ambient light with incident angles perpendicular to the board. FIG. 5 further depicts the detection zones for each of the ambient light sensors 122, 123 and 124 on the board. It is also possible to install additional light sensors that are aimed perpendicular to the surface of the board on the same side as the batteries (not shown).

Additionally in the exploded view of FIG. 4, front end cap 130 is shown as connected to the plastic tube 150. This front end cap 130 contains an opening for the on-off switch 125, and can be permanently attached to the plastic tube. Rear end cap 140, is a removable end cap that can be connected to the tube with either a friction fit, screw threads, or other coupling means. Cap 140 is removed by the user in order to slide out the printed circuit board assembly 120, as well as, allowing access to change the batteries 110.

Figure 6:
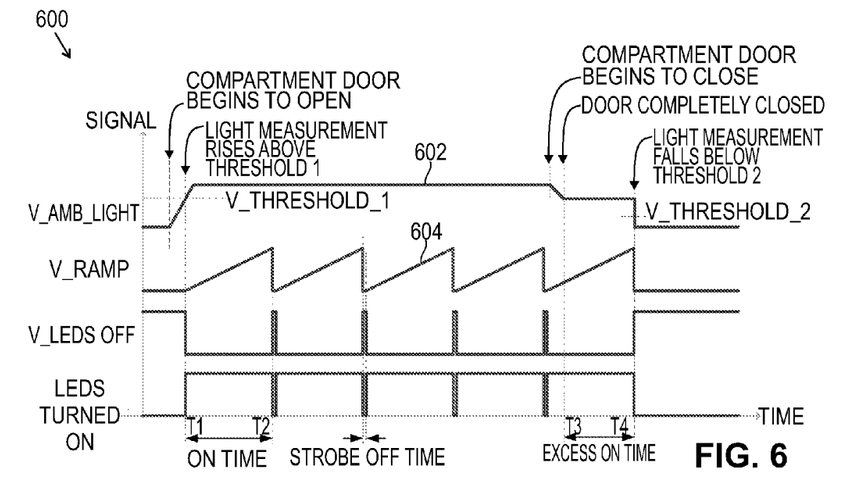
FIG. 6 shows waveforms and timing diagrams illustrating a method of ambient light measurement and strobing of the LEDs in accordance with the present invention.
Figure 7:
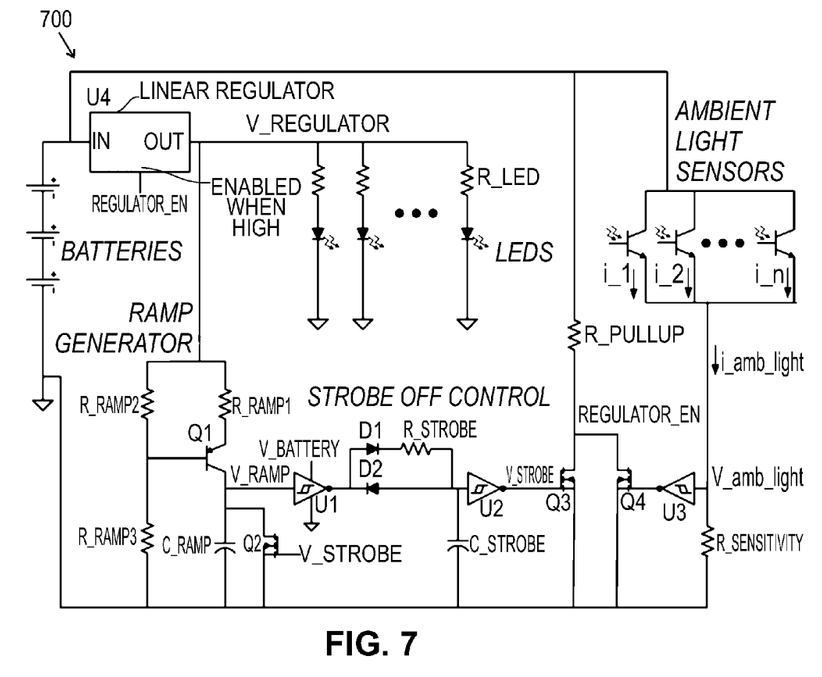
FIG. 7 shows a presently preferred embodiment of control circuitry for driving the LED sources of LED light modules in accordance with the present invention.

FIG. 6 depicts waveforms and timing diagrams 600 illustrating aspects of LED drive circuit operation and is best understood in combination with the simplified schematic of circuit 700 shown in FIG. 7. In the time before T1, the compartment containing the LED module is sealed shut. The ambient light measurement 602 is represented by a very low DC voltage signal, V_amb_light (nearly zero volts) as a result of the nearly zero ambient light sensor current, i_amb_light. Expressions for the total ambient light current and ambient light voltage are given by:

$$V\_amb\_light = R\_sensitivity \times i\_amb\_light \quad (1)$$

$$i\_amb\_light = i\_1 + i\_2 + \ldots + i\_n \quad (2)$$

Where i_1 through i_n represent the phototransistor currents of multiple phototransistors wired in a parallel configuration.

The first threshold can be set by a Schmitt triggered input inverter which has a nominal rising edge threshold of about 60% of the inverter supply voltage. In the presently preferred embodiment, the Schmitt triggered inverters are all operating directly from the series combination of the three alkaline AA batteries resulting with each cell voltage nominally 1.2V. The first threshold level is therefore given by:

$$V\_threshold\_1 = (1.20 V) \times 3 \times 60\% = 2.2 V \quad (3)$$

When the magnitude of V_amb_light is less than 2.2V, inverter U3 will drive the gate of Q4 high which pulls Regulator_EN low, disabling the linear regulator, U4 and keeping the LEDs powered down. While in the LEDs-off state, the output of the ramp generator circuit, V_ramp 604, is nearly zero volts since the ramp supply voltage, V_regulator is disabled. Since V_ramp is below the Schmitt inverter U1's first threshold, U1's output is driven high which charges C_strobe to nearly V_battery through diode D1 and charging resistor R_strobe. This, in turn, causes the output of U2 to drive the gate of Q3 low rendering the Q3 non-conductive. Transistors Q3 and Q4 along with pullup resistor R_pullup form a logic NOR operation such that if either V_strobe is high or U3 output is high due to the absence of ambient light, the linear regulator is disabled.

The current draw from the batteries while the LEDs are off is on the order of 30 micro amperes (UA), just enough to power the inverters and the ambient light sensor.

When the compartment door opens, light incident on the surface of the various phototransistors placed around the LED module will generate currents i_1 through i_n for n phototransistors. These currents add together and flow through R_sensitivity to generate V_amb_light. At time T1, enough combined ambient light is measured by the sensors that V_amb_light exceeds the first threshold causing U3 to drive the gate of Q4 low rendering it non-conductive. With Q3 still in the non-conductive state as described earlier, the regulator_EN is driven high through pullup resistor R_pullup which enables the linear regulator U4 and causes V_regulator to be nominally 3.2 VDC.

With the regulator enabled, the ramp generator receives power and V_ramp begins to increase in a linear fashion until the V_ramp voltage reaches the first threshold level of U1 (the rising edge threshold) which occurs at time T2 after the ramp on time duration calculated by:

$$\text{on time} = \frac{V_{threshold1} R_{ramp1} C_{ramp}}{\left( V_{regulator} \frac{R_{ramp2}}{R_{ramp3} + R_{ramp2}} - V_{beQ1} \right)}$$

Where, V_be Q1 is the forward base-emitter voltage drop of Q1.

During the ramp on time, the output of U1 remains high as it did before T1. Therefore, C_strobe is fully charged to V_battery. At T2, the output of U1 is driven low, and C_strobe is discharged rapidly through diode D2 which causes U2 to turn on Q3 to begin an LED strobe off duration.

With U2 asserted driving an output high at T2, Q3 is rendered conductive and Regulator_EN is driven to nearly zero volts. As a result, the linear regulator is disabled and the ramp capacitor, C_ramp is discharged by Q2 to reset the ramp generator. The LEDs will remain off for a strobe off time, set by R_strobe, C_strobe, and the rising edge threshold of U2 by the following expression:

$$(V_{battery} - V_{D1})\left( 1 - e^{\frac{-R_{strobe} C_{strobe}}{\text{strobe off time}}} \right) = V_{threshold1}$$

$$\text{strobe off time} = \frac{-R_{strobe} C_{strobe}}{\ln\left( 1 - \frac{V_{threshold1}}{V_{battery} - V_{D1}} \right)}$$

At the end of the strobe off period, U2 drives the gate of Q3 low rendering Q3 non-conductive. Provided the measured ambient light, V_amb_light, is still greater than the first Schmitt inverter threshold of U3, Q4 will also remain non-conductive and the regulator will be re-enabled once more.

If the measured ambient light drops below a second threshold of the Schmitt trigger which is nominally 30% of the supply voltage or:

$$V\_threshold\_2 = (1.20V) \times 3 \times 30\% = 1.1V \quad (1)$$

Then the gate of Q4 will be driven on rendering the transistor conductive and the regulator will be disabled.

Absent the strobe, it is unlikely that the measured ambient light will ever have the opportunity to drop below the second threshold level while the LEDs are powered since a portion of the LED module light will make its way into the ambient light sensors. At time T3, the compartment door is completely closed and the signal registered on V_amb_light represents the contribution from the LED module itself. On the next strobe off event beginning at T4, the ambient light can be measured while the LEDs are momentarily turned off. Since the door is closed and the compartment is dark, the V_amb_light signal quickly falls below the second threshold and the Q4 is rendered conductive preventing the linear regulator from re-enabling. Table 1 lists the preferred values for components that may suitably be employed in the embodiment of the invention described above.

TABLE 1

| Reference Designator | Value |
| --- | --- |
| U1, U2, U3 | sn74hc14 |
| R_LED | 1.2 ohm |
| R_ramp1 | 470 kohm |
| R_ramp2 | 100 kohm |
| R_ramp3 | 220 kohm |
| C_ramp | 100 uF |
| R_strobe | 33 kohm |
| C_strobe | 1 uF |
| R_pullup | 220 kohm |
| R_sensitivity | 1000 kohm |

The circuitry described above is only one illustrative circuit 700 to control the LED module light measurement and strobing off behavior for the purposes described herein. It is also possible to achieve this desired behavior with the use of a microcontroller or other digital logic devices to track time intervals and control the regulator enable pin. Ambient light sensing can also be accomplished with other light sensing devices besides phototransistors through the use of other photoconductive or photovoltaic devices including photodiodes, photoresistors and photocells. The ambient light detection circuitry may alternatively be configured to detect a change in ambient light level rather than a level above or below a fixed threshold, for instance, turning on the LED light when the ambient light signal described above increases by 1.0V over a particular time duration such as 10 milliseconds (ms).

Figure 8:
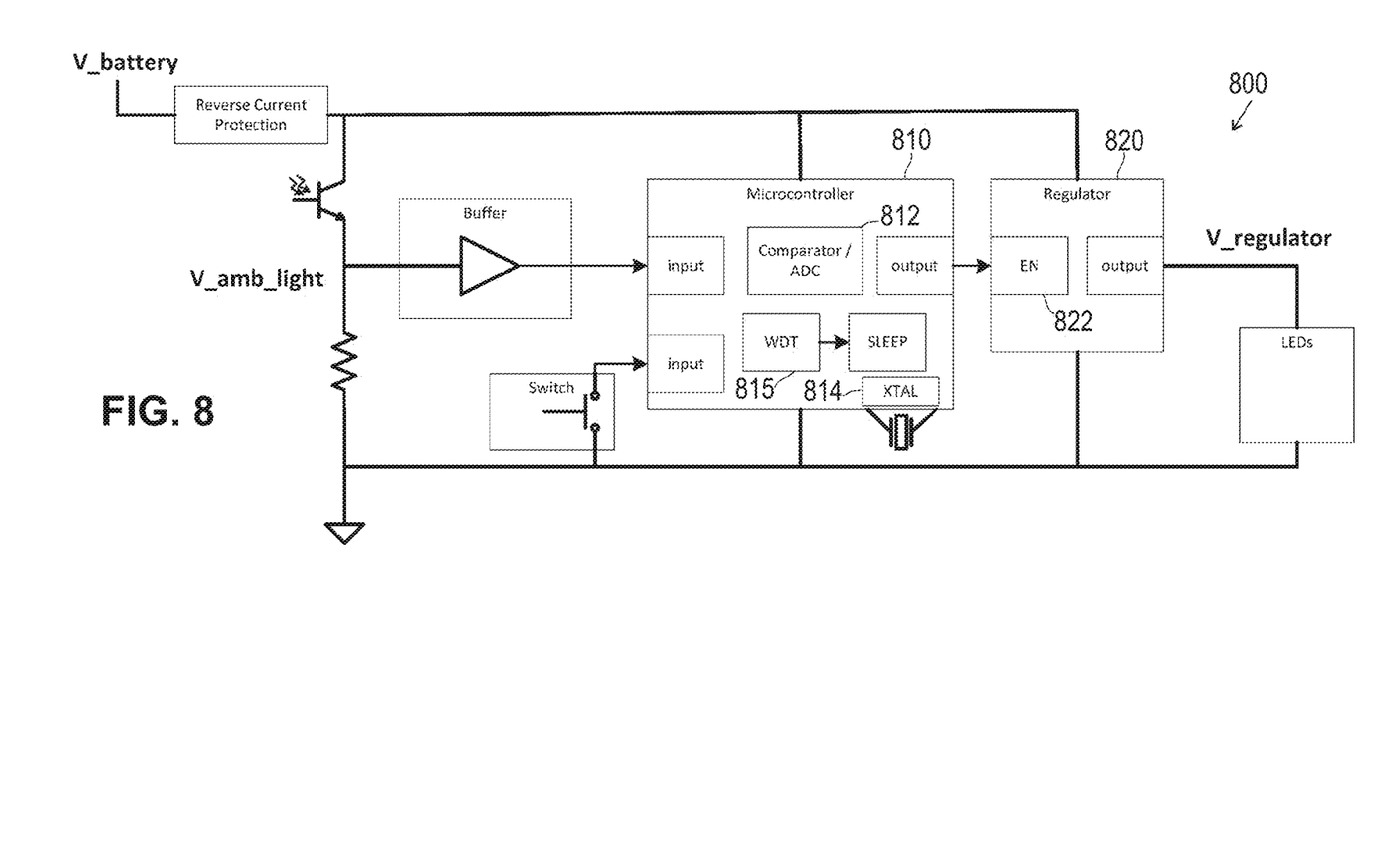
FIG. 8 shows an illustration of an alternate embodiment of control circuitry for driving the LED sources of LED light modules.

FIG. 8 demonstrates an alternative, controller 800 according to the embodiment of the present invention which uses a microcontroller 810 to control the LED module behavior. The ambient light voltage, V_amb_light is sensed by the microcontroller's internal analog to digital converter (ADC) or by an internal comparator means 812. If V_amb_light is found to rise about a particular threshold, the microcontroller drives an enable pin 822 of linear regulator 820 high activating the LEDs. The advantage of a microcontroller implementation is the ability to precisely control the LED on time and off time through the use of a precise clock, such as a crystal oscillator 814, as a timing reference. A second advantage of a microcontroller implementation is the ability to adjust the turn on threshold for the V_amb_light dynamically. The microcontroller can be controlled to monitor for a single threshold crossing condition for V_amb_light at a particular level or it can be set to monitor the V_amb_light signal for a small change in received light. In this manner, the microcontroller can compensate for small amounts of offset in the V_amb_light signal that may be the result of the module being deployed inside a less than completely dark compartment.

Figure 9:
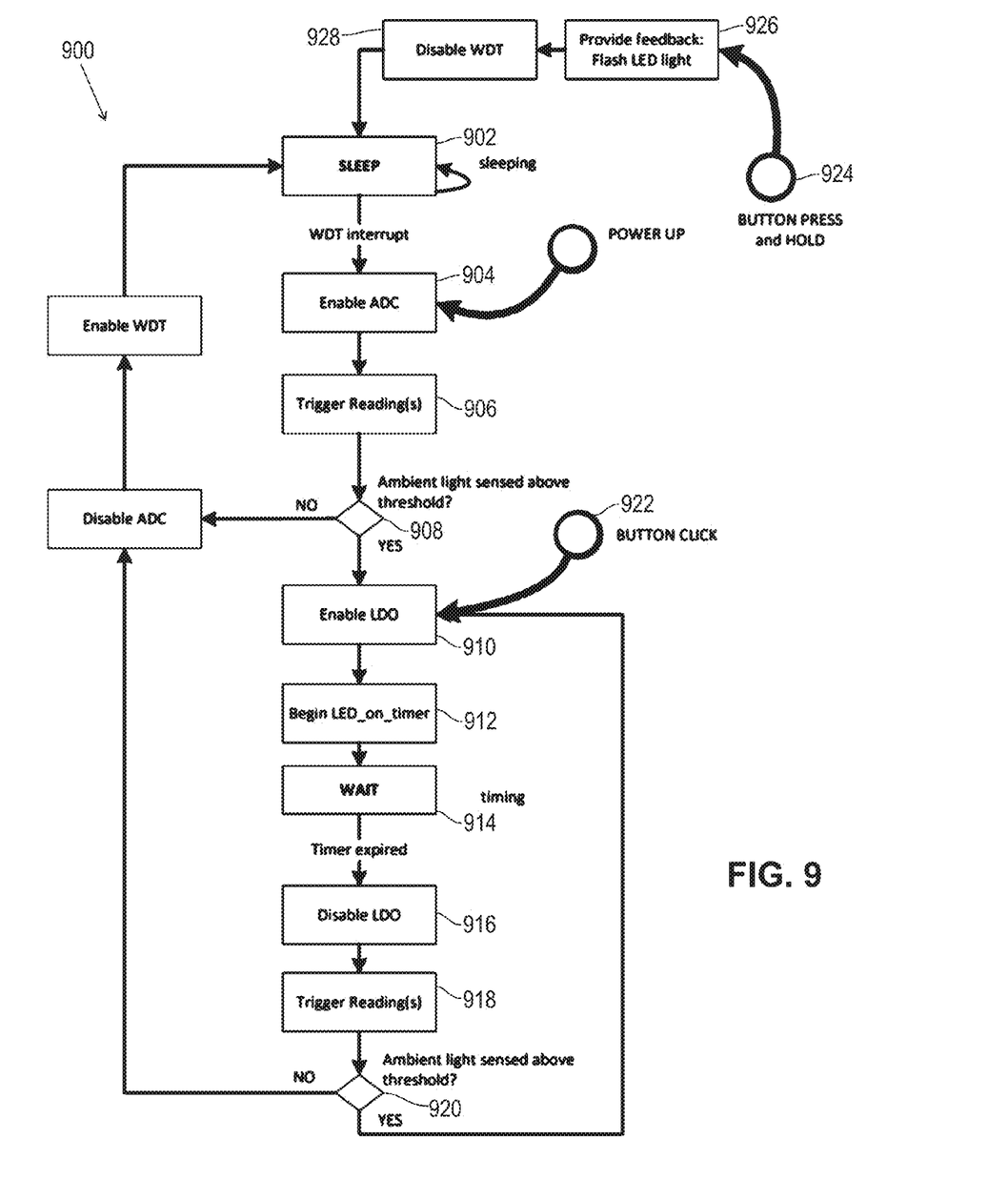
FIG. 9 shows a flow chart of operation of the alternate embodiment control circuitry.

FIG. 9 illustrates a preferred method 900 for microcontroller operation. The microcontroller 810 spends the majority of its time in a low power sleep state 902. The microcontroller's watchdog timer (WDT) 815 remains active while sleeping, and is configured to periodically wake the microcontroller from its sleep state 904, preferably every 20 ms, to perform an ADC reading 906 of the V_amb_light signal. If the measured signal is above a particular threshold 908, the microcontroller enables the low drop out regulator (LDO) 910 which powers the LEDs on and begins an on time duration timer 912 and then enters the wait state 914. The microcontroller remains in the wait state for a configured duration of time, preferably 30 seconds, at which point the LDO is disabled 916 causing the LEDs to turn off. Once LEDs are turned off, additional ADC readings 918 are taken to measure the compartment ambient light level in the absence of light from the LED module itself. If those measurements are found to be above a particular threshold 920, the LDO is re-enabled 910 causing the LEDs to turn on again 912. Additionally, the microcontroller monitors for button presses. If a quick button press or click is detected 922, the microcontroller enables the LDO 910 and forces the LEDs to turn on for a 30 second period 912. This allows a customer to force the LEDs on by tapping the button even if operating the light in a completely dark environment. By pressing and holding the button 924, the LED module can provide feedback 926, disable the WDT 928 and thus prevent the microcontroller from taking any ambient light measurements so that it remains in a low power sleep state indefinitely until a quick button press is detected. To avoid draining the batteries in the event that the ambient light remains above the turn on threshold level for an extended period of time, a max LED on time limit can be set to turn off the LED lights preferably set to 5 minutes. In this case, reactivation of the LEDs would require the ambient light to dip below the turn off threshold and then rise above the turn on threshold or a button click.

Figure 10:
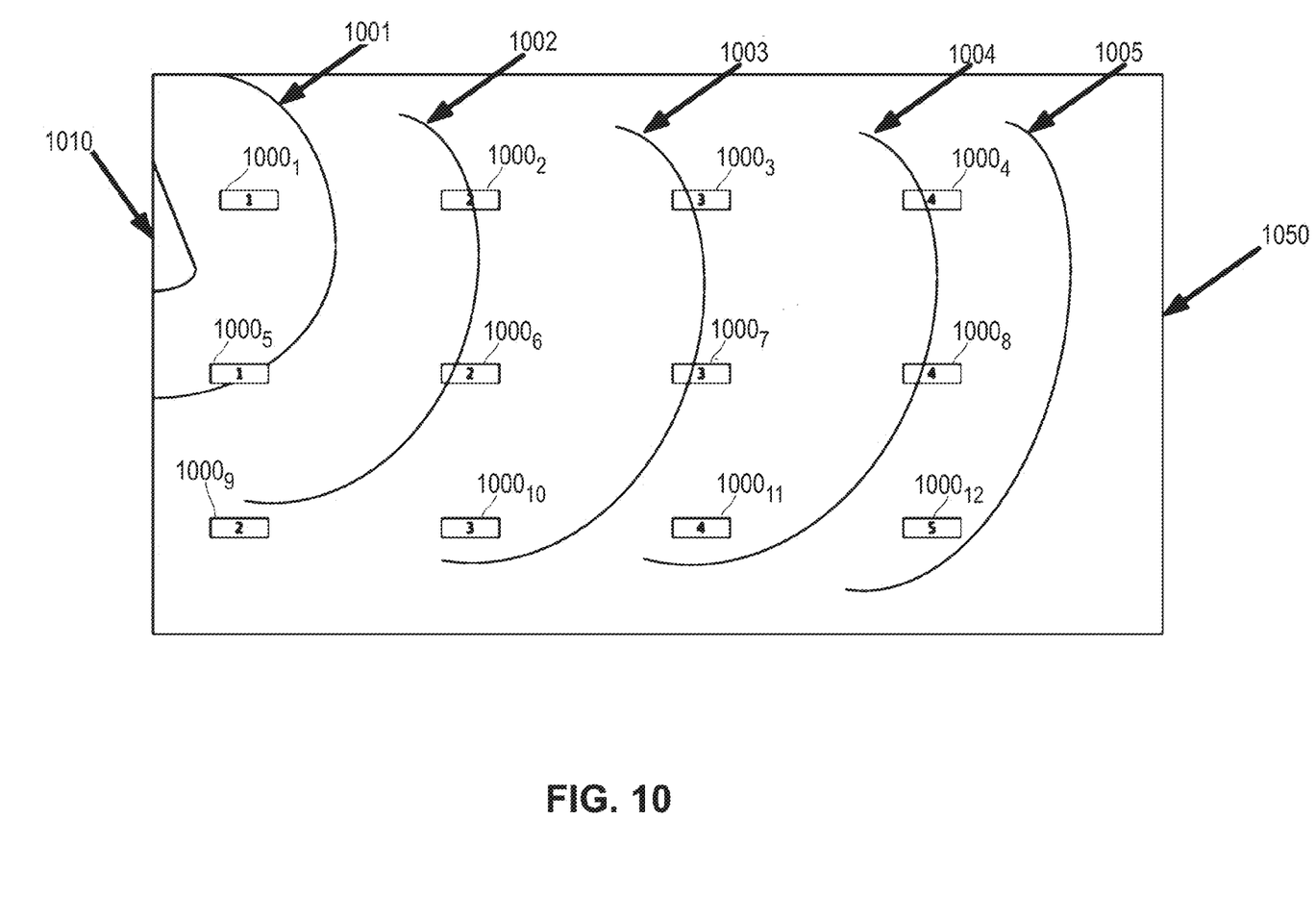
FIG. 10 shows an arrangement of multiple LED light modules within a compartment.

If multiple LED modules are installed within the same dark enclosure space, it is likely that the LED light from one module will be detected by the ambient light sensors from nearby modules. In FIG. 10, twelve LED modules $1000_1$, $1000_2$, ... $1000_{12}$ (collectively 1000) are arranged within a dark room 1050. At the instant a door 1010 opens, ambient light penetrates the room out to position 1001 which causes only modules labeled with a "1" to turn on their LEDs. A brief instant later, the light from modules marked with a "1" penetrates the room out to position 1002 which causes all modules marked with a "2" to light up. The light from these modules penetrates the room out to position 1003 which causes modules marked with a "3" to turn on. Modules marked with "3" extend the light into the room to position 1004 turning on modules marked with "4" which then in turn extend the light out to position 1005 turning on the module marked with a "5". In this manner, a much larger space can be illuminated with several LED modules if even one of the modules detects the presence of ambient light. For the modules to all turn off in the absence of ambient light, they must all share a portion of their strobe off time interval in common such that a measurement of the room light can be taken by each module without any light contribution from the other nearby LED modules.

Figure 11:
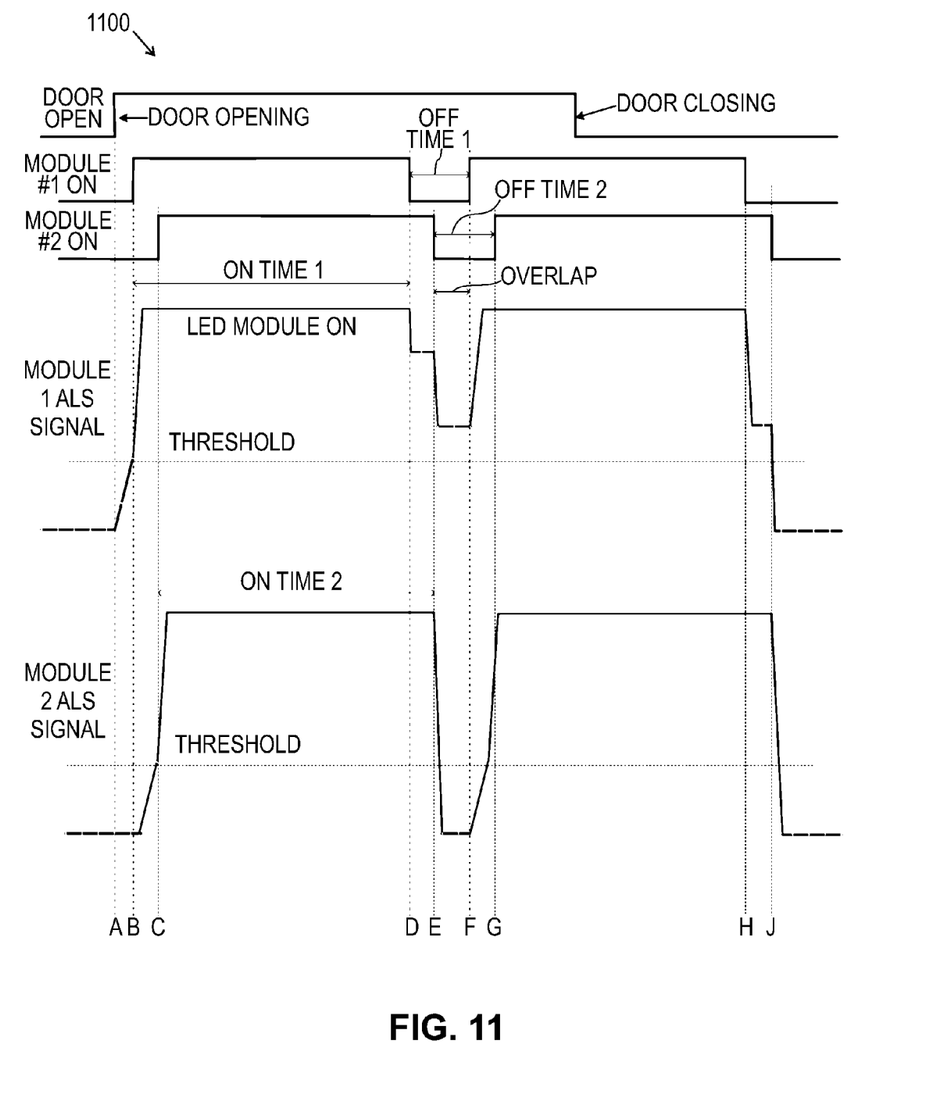
FIG. 11 illustrates waveforms and timing diagrams employed in a method of ambient light measurement and strobing of the LEDs for two LED light modules placed within the same compartment.

FIG. 11 shows waveforms and timing diagrams 1100, illustrating how the V_amb_light signal (ALS) is impacted by having two LED modules operating in close proximity to one another. In this particular example, it is assumed that only module 1 can detect ambient light from the compartment door being opened, module 2 is too far inside the dark compartment so that it does not detect any ambient light contribution from the outside environment when the door is opened. At time A, the compartment door is opened and module 1, which is located closer to the door senses the ambient light level increasing indicated by a rising ALS signal. At time B, the module 1's ALS signal crosses a detection threshold which causes module 1 LEDs to turn on and causes the ALS signal for module 1 to rapidly rise towards a maximum level (saturation). At the same time, module 2 begins to sense the ambient light from module 1's LEDs as evidence by module 2's ALS signal rising. At time C, module 2's ALS signal crosses its detection threshold causing module 2 to similarly activate its own LEDs. Given that module 1 turned on slightly before module 2, module 1 will turn off before module 2 at time D. With module 1 off, the ALS signal at module 1 will no longer detect light from its own LEDs but will detect the combination of ambient room light and LED light from module 2 which is still lit. At time E, module 2 turns off its LED light and the ALS signal from module 1 drops down to reflect the measurement of ambient room light alone. In this example, the compartment door is still open during this measurement interval which causes the ambient room light level to remain above the detection threshold for the remainder of the off time interval.

At the conclusion of module 1's off time interval at time F, module 1 reactivates its LEDs due to the continued presence of ambient room light which once again activates module 2 at time G. Prior to time H, the compartment door is closed such that at time H, when the first module turns off its LEDs, it only detects light from the LEDs of module 2. At time J, module 2 turns off its LEDs and the measured light on both modules falls below the detection thresholds preventing both modules from re-enabling. It is critical in the above described scheme for there to be overlap in the off times between modules placed within the same compartment so that there is at least a minimum period of time, preferably 100 ms, that no LED modules are turned on inside the compartment such that the room ambient light contribution alone can be measured. Through the use of a microcontroller with a crystal timing reference, the on time and off time accuracies can be held with a high enough precision between several modules to maintain this minimum overlap requirement using preferably 30 second on times and 500 ms off times.

Figure 12:
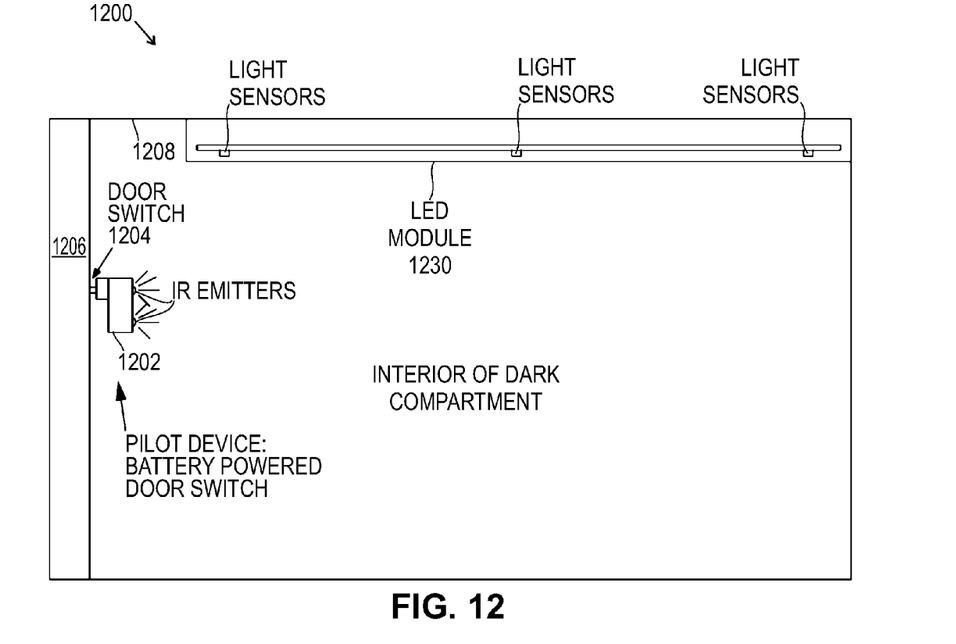
FIG. 12 illustrates a door switch accessory for energizing the LED light module.

In the case it is desirable for the LED module to automatically turn on when placed inside a compartment that is opened without the presence of any ambient light, such as a safe being opened in a dark room, a portable pilot light device 1202 can be used to force the LED module on as shown for compartment 1200 in FIG. 12. The pilot light may be in the form of a door switch 1204 installed such that when the compartment door 1206 is opened, a switch contact switches from a normally closed position to an open position. Electronics inside the pilot light illuminate a pilot light source, preferably an infrared LED, that is directed towards an LED module 1230 mounted inside the compartment 1200. In this manner, when the door 1206 is opened, the pilot device 1202 shines light at the LED module 1230 which causes the module ambient light sensor to rise above the trip threshold and turn on the LEDs. The pilot light device is preferably battery powered and attached with Velcro™ or adhesively attachable to a compartment wall 1208 near the interface 1210 with the door 1206. To increase battery life, the pilot light device may strobe the infrared light on upon detecting the door open condition rather than staying lit continuously while the door remains open. In place of a door switch, the pilot device may also be triggered by proximity sensors, such as passive or reflective IR, or ultrasonic, by vibration sensors, or by an ambient light sensor. The pilot light source may alternatively be a visible light LED.

Figure 13:
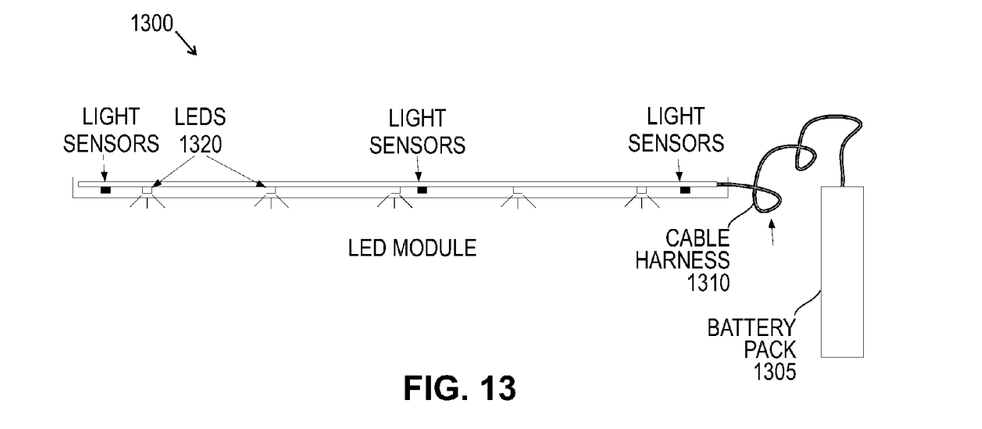
FIG. 13 shows an alternate mechanical embodiment of the LED module.

FIG. 13 depicts an alternate mechanical construction of an LED light module 1300 to the construction shown in FIG. 4 wherein the battery power source is located remotely from the LED module and power is delivered from a battery pack 1305 to LEDs 1320 and ambient light sensors through a cable harness 1310. This alternate implementation allows for a slimmer LED module which may be desirable for the illumination of smaller compartments.

It will be clear that there are numerous configurations and embodiments possible using the technology and techniques described above. While the present invention is disclosed in the context of presently preferred embodiments, it will be recognized that a wide variety of implementations may be employed by persons of ordinary skill in the art consistent with the above discussion and the claims which follow below. For example, specific numbers and placements of LEDs, light sensors and other components are shown. It will be recognized that the numbers may be varied so that as few as one LED and sensor may suitably be employed depending upon the lighting context, and more or less LEDs or sensors may be employed and arranged in different physical arrangements as desired to suit the end environment.

I claim:

1. A light source comprising:
a light emitting diode LED;
an ambient light detector detecting an illumination in a volume proximate the LED; and
a controller receiving an output from the ambient light detector and automatically turning on power to the LED when the output from the ambient light detector indicates a first change in the illumination above a first threshold, the controller also interrupting power to the LED for a predetermined period to allow the ambient light detector to detect a second change in the illumination level below a second threshold.

2. The light source of claim 1, wherein upon the ambient light detector detecting the ambient illumination level below the second threshold during the predetermined period, an output is provided to the controller which powers off the LED.

3. The light source of claim 1, wherein upon the ambient light detector not detecting an ambient illumination level below the second threshold during the predetermined period, the controller returns the power from the battery to the LED.

4. The light source of claim 1, wherein the predetermined period is sufficiently short that the LED is turned off for a time not discernible by the human eye.

5. The light source of claim 1, wherein the predetermined period is sufficiently long that the LED is turned off for a time discernible by the human eye.

6. The battery powered light source of claim 5, wherein the controller operates to strobe the LED to provide an indication that the LED has been left on.

7. The light source of claim 1, wherein detection of a sufficient positive change in ambient illumination triggers turning the LED on.

8. The light source of claim 1 further comprising:
a battery to supply power to the controller and the light emitting diode.

9. The light source of claim 8 further comprising:
a mechanical on and off switch to turn the light source on in a flashlight mode of operation.

10. A light source and compartment combination comprising:
a light source comprising:
a light emitting diode (LED);
an ambient light detector detecting illumination in a volume proximate the LED;
a controller receiving an output from the ambient light detector and automatically turning on power to the LED when the output from the ambient light detector indicates a change in the illumination above a first threshold, the controller also interrupting power to the LED for a predetermined period to allow the ambient light detector to detect a change in the illumination below a second threshold; and a compartment which opens and closes within which the light source is mounted.

11. The combination of claim 10 wherein when the compartment is closed, the compartment is in a near dark state and the LED is off, and when the compartment is opened, ambient light is admitted and the LED is turned on to light the compartment.

12. The combination of claim 11 wherein when the compartment is closed after being opened, the ambient light detector detects a change in the illumination below the second threshold during the predetermined period and the LED is turned off.

13. The combination of claim 10 wherein the compartment further comprises:

a pilot light arranged to be detected by the ambient light detector, the pilot light being turned on when the compartment is opened and turned off when the compartment is closed whereby the light source is activated when the access door is opened and the ambient light is above the first threshold by the ambient light detector detecting light from the pilot light.

14. The combination of claim 10 further comprising:
plural light sources having the same construction, and
the controllers of the plural light sources operating in a synchronized manner whereby the ambient light detector of a first light source detects a change in ambient light is turned on and in turn triggers a second light source.

15. The combination of claim 14, wherein all of the plural light sources are strobed off for a predetermined common period of time allowing all the plural light sources to be turned off together.

16. A method of controlling a light emitting diode (LED) based light source comprising:

detecting an illumination in a volume proximate a first LED utilizing an ambient light detector;

automatically turning on the first LED by a controller turning on power to the first LED upon receiving an output from the ambient light detector indicating a first change in the illumination above a first threshold; and interrupting power to the first LED for a predetermined period to allow the ambient light detector to detect a second change in the illumination below a second threshold.

17. The method of claim 16 further comprising:

powering off the first LED after detecting the ambient illumination below the second threshold; and continuing to power the first LED after detecting the ambient illumination remains above the second threshold.

18. The method of claim 16 wherein said step of interrupting power is performed repeatedly.

19. The method of claim 18 wherein said step of interrupting power occurs slowly enough so the first LED turns off so as to humanly be visible.

20. The method of claim 16 wherein a second LED and second ambient light detector are arranged with respect to the first LED so that turning on the first LED is detected as a change in illumination by the second ambient light detector and the change in illumination is utilized to turn on the second LED.

* * * * *